(12) United States Patent
Cismas et al.

(10) Patent No.: US 9,934,475 B2
(45) Date of Patent: Apr. 3, 2018

(54) MANAGING ENTERPRISE DATA MOVEMENT USING A HEURISTIC DATA MOVEMENT DETECTION ENGINE

(71) Applicant: Bank of America Corporation, Charlotte, NC (US)

(72) Inventors: Sorin N. Cismas, Southlake, TX (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 359 days.

(21) Appl. No.: 14/710,698

(22) Filed: May 13, 2015

(65) Prior Publication Data

US 2016/0335569 A1  Nov. 17, 2016

(51) Int. Cl.
G06Q 10/00 (2012.01)
G06Q 10/06 (2012.01)
H04L 12/24 (2006.01)

(52) U.S. Cl.
CPC ......... *G06Q 10/0631* (2013.01); *H04L 41/06* (2013.01); *H04L 41/22* (2013.01)

(58) Field of Classification Search
CPC ..... G06Q 10/0631; H04L 41/06; H04L 41/22; H04L 41/0816; H04L 41/142; H04L 41/16; H04L 41/5009; H04L 41/5051; H04L 43/08; H04L 43/0894; H04L 43/16; H04L 47/10; H04L 63/14; H04L 63/1425; H04L 63/1441
USPC ................................................ 705/7.11–7.42
See application file for complete search history.

(56) References Cited

U.S. PATENT DOCUMENTS 5,126,728 A * 6/1992 Hall ................... G06F 21/6227
                                                      713/153
5,627,886 A * 5/1997 Bowman ................. H04M 3/36
                                                         379/111
5,864,683 A * 1/1999 Boebert ................. G06F 21/53
                                                         709/249

(Continued)

OTHER PUBLICATIONS

Zhang, Olive Qing, et al. "How to track your data: Rule-based data provenance tracing algorithms." Trust, Security and Privacy in Computing and Communications (TrustCom), 2012 IEEE 11th International Conference on. IEEE, 2012.*

*Primary Examiner* — Alan S Miller
(74) *Attorney, Agent, or Firm* — Banner & Witcoff, Ltd.; Michael A. Springs

(57) ABSTRACT

Methods, systems, and computer-readable media for managing enterprise data movement using a heuristic data movement detection engine are presented. In some embodiments, a computer system may receive one or more data packets associated with a movement of enterprise data intercepted by a filtering engine. Subsequently, the computer system may evaluate the one or more data packets associated with the movement of enterprise data intercepted by the filtering engine based on at least one predefined data movement pattern. Then, the computer system may detect at least one variation from the at least one predefined data movement pattern based on the evaluating of the one or more data packets associated with the movement of enterprise data intercepted by the filtering engine. Thereafter, the computer system may send at least one alert message based on the detecting of the at least one variation from the at least one predefined data movement pattern.

18 Claims, 12 Drawing Sheets

(56) References Cited

U.S. PATENT DOCUMENTS

| | | | |
|---|---|---|---|
| 7,080,225 B1* | 7/2006 | Todd | G06F 3/061 711/154 |
| 7,467,067 B2 | 12/2008 | Marvasti | |
| 7,664,048 B1* | 2/2010 | Yung | H04L 41/28 370/235 |
| 7,694,150 B1 | 4/2010 | Kirby | |
| 7,917,955 B1 | 3/2011 | Spurlock et al. | |
| 8,204,058 B2 | 6/2012 | Wu et al. | |
| 8,607,325 B2* | 12/2013 | Kennedy | G06F 21/55 726/12 |
| 8,701,192 B1 | 4/2014 | Glick et al. | |
| 8,756,594 B2* | 6/2014 | Umansky | G06F 21/554 717/173 |
| 8,792,493 B2 | 7/2014 | Tze-Si Wu et al. | |
| 8,839,458 B2* | 9/2014 | Vilppola | G06F 21/51 726/30 |
| 8,879,427 B2* | 11/2014 | Krumel | H04L 29/06 370/255 |
| 9,098,702 B2* | 8/2015 | Rubin | G06F 21/554 |
| 9,215,236 B2* | 12/2015 | Kennedy | G06F 21/55 |
| 9,503,470 B2* | 11/2016 | Gertner | H04L 63/145 |
| 9,515,957 B2* | 12/2016 | Kurian | H04L 47/783 |
| 2003/0172220 A1* | 9/2003 | Hao | H04L 43/16 710/305 |
| 2004/0221172 A1* | 11/2004 | Stamos | G06F 21/606 726/27 |
| 2005/0286417 A1* | 12/2005 | An | H04L 29/06027 370/229 |
| 2006/0026679 A1* | 2/2006 | Zakas | H04L 29/06 726/22 |
| 2006/0129627 A1* | 6/2006 | Phillips | H04L 63/10 709/200 |
| 2006/0253445 A1* | 11/2006 | Huang | G06F 21/554 |
| 2008/0025387 A1* | 1/2008 | Lim | H04N 7/185 375/240.01 |
| 2008/0091830 A1* | 4/2008 | Koshino | H04L 47/10 709/227 |
| 2008/0229415 A1* | 9/2008 | Kapoor | G06F 21/55 726/22 |
| 2009/0300149 A1* | 12/2009 | Ferris | G06F 15/177 709/222 |
| 2011/0209193 A1* | 8/2011 | Kennedy | G06F 21/55 726/1 |
| 2011/0209196 A1* | 8/2011 | Kennedy | G06F 21/55 726/1 |
| 2012/0137340 A1 | 5/2012 | Jakobsson et al. | |
| 2013/0111462 A1* | 5/2013 | Umansky | G06F 21/554 717/174 |
| 2013/0305374 A1* | 11/2013 | Rubin | G06F 21/554 726/24 |
| 2014/0188541 A1 | 7/2014 | Goldsmith et al. | |
| 2014/0189507 A1 | 7/2014 | Valente et al. | |
| 2014/0192436 A1 | 7/2014 | Kwon et al. | |
| 2014/0200036 A1 | 7/2014 | Egner et al. | |
| 2014/0207871 A1 | 7/2014 | Miloushev et al. | |
| 2014/0222610 A1 | 8/2014 | Mikurak | |
| 2014/0229409 A1 | 8/2014 | Kaushal et al. | |
| 2014/0233171 A1 | 8/2014 | Ozias et al. | |
| 2014/0237393 A1 | 8/2014 | Van Wie et al. | |
| 2014/0244429 A1 | 8/2014 | Clayton et al. | |
| 2014/0244447 A1 | 8/2014 | Kim et al. | |
| 2014/0244488 A1 | 8/2014 | Kim et al. | |
| 2014/0254605 A1 | 9/2014 | Anumala et al. | |
| 2014/0280515 A1 | 9/2014 | Wei et al. | |
| 2014/0281308 A1 | 9/2014 | Lango et al. | |
| 2014/0281918 A1 | 9/2014 | Wei et al. | |
| 2014/0282877 A1 | 9/2014 | Mahaffey et al. | |
| 2014/0282879 A1* | 9/2014 | Livshits | G06F 21/52 726/3 |
| 2014/0289534 A1 | 9/2014 | Parry et al. | |
| 2014/0295786 A1 | 10/2014 | Maier et al. | |
| 2014/0297268 A1 | 10/2014 | Govrin et al. | |
| 2014/0310219 A1 | 10/2014 | Prahlad et al. | |
| 2014/0324530 A1 | 10/2014 | Thompson et al. | |
| 2014/0340787 A1 | 11/2014 | Kwon | |
| 2014/0340834 A1 | 11/2014 | Lee et al. | |
| 2014/0341109 A1* | 11/2014 | Cartmell | H04L 45/308 370/328 |
| 2014/0344922 A1 | 11/2014 | Lam et al. | |
| 2014/0351810 A1 | 11/2014 | Pratt et al. | |
| 2014/0355563 A1 | 12/2014 | Sane et al. | |
| 2014/0358825 A1 | 12/2014 | Phillipps et al. | |
| 2014/0358828 A1 | 12/2014 | Phillipps et al. | |
| 2014/0359363 A1 | 12/2014 | Biem | |
| 2014/0359777 A1 | 12/2014 | Lam et al. | |
| 2015/0012757 A1 | 1/2015 | Binder | |
| 2015/0039651 A1 | 2/2015 | Kinsely et al. | |
| 2015/0040052 A1 | 2/2015 | Noel et al. | |
| 2015/0043103 A1 | 2/2015 | Powell | |
| 2015/0052148 A1 | 2/2015 | Indeck et al. | |
| 2015/0055608 A1 | 2/2015 | Egner et al. | |
| 2015/0056960 A1 | 2/2015 | Egner et al. | |
| 2015/0057964 A1 | 2/2015 | Albinali | |
| 2015/0057967 A1 | 2/2015 | Albinali | |
| 2015/0061901 A1 | 3/2015 | Casparian et al. | |
| 2015/0061902 A1 | 3/2015 | Casparian et al. | |
| 2015/0081135 A1 | 3/2015 | Gompert et al. | |
| 2015/0081890 A1* | 3/2015 | Richards | H04L 43/08 709/224 |
| 2015/0088968 A1 | 3/2015 | Wei et al. | |
| 2015/0088969 A1 | 3/2015 | Wei et al. | |
| 2015/0088970 A1 | 3/2015 | Wei et al. | |
| 2015/0094836 A1 | 4/2015 | Rivers et al. | |
| 2015/0109012 A1 | 4/2015 | Yang et al. | |
| 2015/0123562 A1 | 5/2015 | Adriaenssens et al. | |
| 2015/0350230 A1* | 12/2015 | Rubin | G06F 21/554 726/23 |
| 2016/0006792 A1* | 1/2016 | Goldenberg | H04L 67/06 709/206 |
| 2016/0080397 A1* | 3/2016 | Bacastow | H04L 63/1408 726/1 |
| 2016/0080419 A1* | 3/2016 | Schiappa | H04L 63/20 726/1 |
| 2016/0164891 A1* | 6/2016 | Satish | H04L 63/20 726/1 |

\* cited by examiner

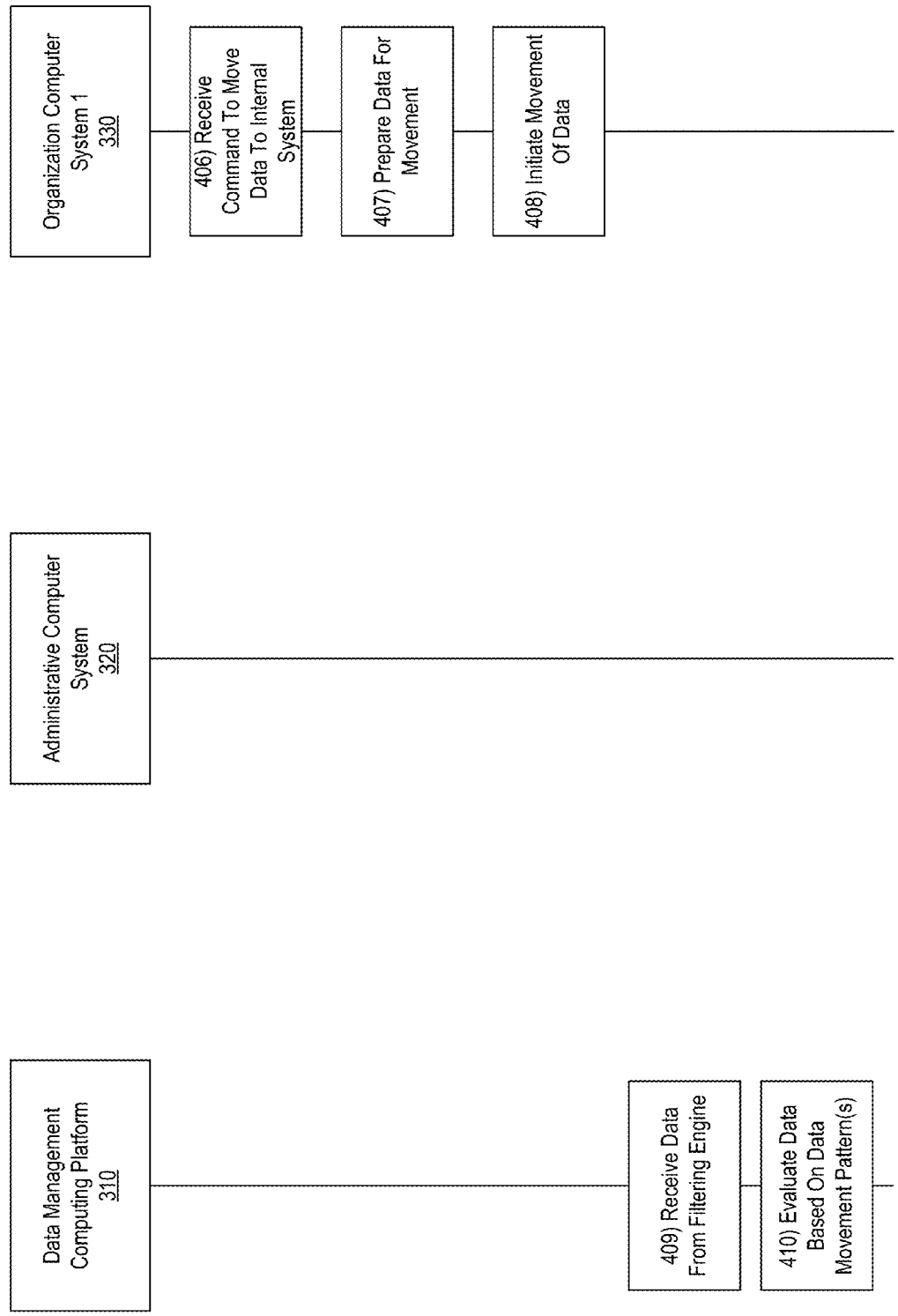

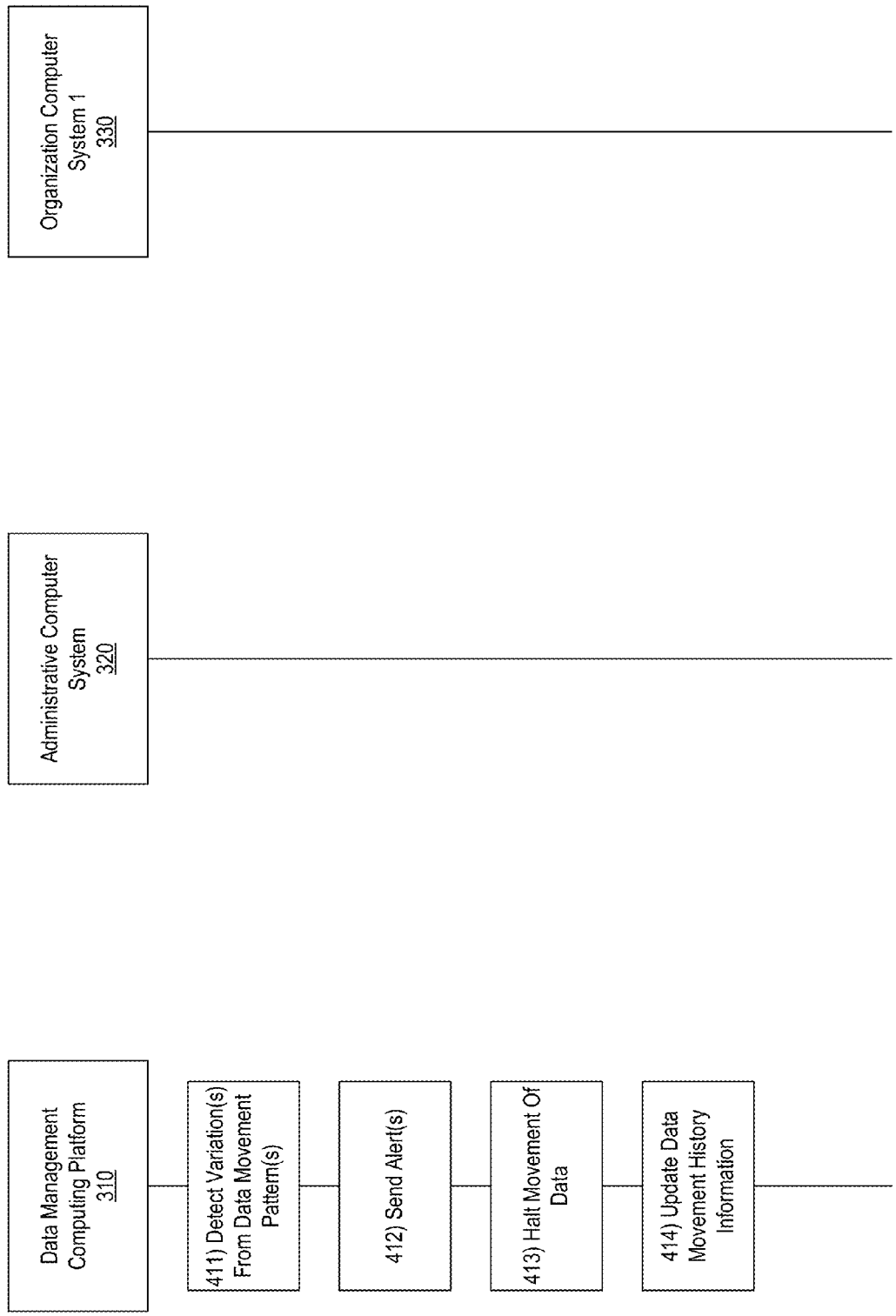

MANAGING ENTERPRISE DATA MOVEMENT USING A HEURISTIC DATA MOVEMENT DETECTION ENGINE

BACKGROUND

Aspects of the disclosure relate to computer hardware and software. In particular, one or more aspects of the disclosure generally relate to computer hardware and software for managing enterprise data movement using a heuristic data movement detection engine.

Large organizations, such as financial institutions, may maintain a relatively great deal of enterprise information, which may be created, stored, and/or otherwise used in the course of business of such organizations. For example, a financial institution may maintain customer information (e.g., customer account information, customer preferences information), internal information (e.g., marketing information, strategy information, other types of confidential information), and/or various other types of information.

As more information is maintained and used electronically by an organization, its employees, and its customers, it may be increasingly important for the organization to ensure the safety and security of such information. In many instances, however, it may be difficult to provide authorized individuals with efficient, easy-to-use, and convenient access to enterprise information and allow such individuals to move, manipulate, and/or otherwise use the enterprise information, while also ensuring the security of the information and pursuing ever greater levels of security for the enterprise information.

SUMMARY

Aspects of the disclosure relate to various systems and techniques that provide effective, efficient, scalable, and convenient ways of managing enterprise information, particularly in ways that utilize a heuristic data movement detection engine to monitor, track, control, and/or otherwise manage what enterprise data is being where, as well as how and/or why such data is being moved.

For example, in accordance with one or more aspects of the disclosure, a data movement detection engine (which may, e.g., also be referred to as a "heuristics engine" in the description below) may track and/or manage enterprise data as it is moved from one enterprise computer system to another enterprise computer system. As the data is moved, the data movement detection engine may utilize heuristics to analyze the movement of the data. For instance, the data movement detection engine may check the movement of the data against one or more patterns, and if the movement of the data does not match the one or more patterns, the data movement detection engine may generate one or more alerts (e.g., to notify a person who is responsible for the data that the movement of the data does not match the one or more patterns) and/or may stop, prevent, reject, and/or otherwise halt the movement of the data (e.g., from a source computer system to a target destination computer system).

In some instances, one or more data movement patterns may be pre-registered and/or otherwise defined, and the data movement detection engine may use such defined patterns in identifying acceptable movements of data (which may, e.g., be permitted to proceed by the data movement detection engine without objection) and/or unacceptable movements of data (which may, e.g., cause the data movement detection engine to generate one or more alerts and/or halt a particular movement of data). For example, a user or business unit may register pattern information defining a planned movement of data from a system of record, and the registered pattern information may identify what data is being moved, how such data is being moved, why such data is being moved, and/or when such data is being moved. Subsequently, the data movement detection engine may track and/or monitor the movement of data from the system of record to a destination system to ensure that the movement of data matches and/or complies with the registered pattern information. If the movement of data does not match or comply with the registered pattern information, the data movement detection engine may generate one or more alerts and/or stop the movement of data (e.g., based on one or more different thresholds being met). For instance, the data movement detection engine may send one or more alerts to the business unit associated with the movement of data, one or more alerts to a governance unit, and/or one or more alerts to an information security team.

In other instances, one or more data movement patterns may be learned and/or stored by the data movement detection engine based on adaptive behavior, and the data movement detection engine may use such learned patterns in identifying acceptable movements of data (which may, e.g., be permitted to proceed by the data movement detection engine without objection) and/or unacceptable movements of data (which may, e.g., cause the data movement detection engine to generate one or more alerts and/or halt a particular movement of data). For example, the data movement detection engine may observe one or more data movement patterns based on a plurality of movements of data between a plurality of enterprise computer systems during a specific period of time (e.g., a day, a week, a month, a year). Based on the one or more data movement patterns observed by the data movement detection engine (which may, e.g., be initiated, permitted, and/or allowed by one or more users), the data movement detection engine may learn and/or store information defining the one or more data movement patterns as acceptable data movement patterns. For instance, in the example above, if the data movement detection engine generates an alert to a user associated with a particular movement of enterprise data, and the user provides input indicating that the movement of enterprise data should proceed, the data movement detection engine may store information defining the particular movement of enterprise data as a normal behavior pattern (which may, e.g., be ignored and/or otherwise allowed to proceed without objection by the data movement detection engine going forward).

In addition to monitoring, tracking, and/or otherwise managing the movement of enterprise data between computer systems within an organization, one or more aspects of the disclosure also may enable monitoring, tracking, and/or managing the movement of enterprise data to external computer systems not associated with the organization. For example, a particular user or business unit may register a data movement pattern indicating that a particular number of files will be moved to a particular external system on a particular periodic basis (e.g., two files a week to a specific external computer system). If the data movement detection engine subsequently detects a variation from the registered data movement pattern (e.g., as enterprise data is moved from a computer system within the organization to an external computer system), the data movement detection engine may send one or more alerts and/or halt the movement of data. As illustrated in greater detail below, the one or more alerts that are generated and/or sent by the data movement detection engine may alert one or more contacts that the movement of data is not acceptable and/or will be rejected going forward, may prompt one or more contacts to confirm that the movement of data is intended and/or provide input indicating whether the movement of data should be used in defining a new acceptable data movement pattern, and/or may notify one or more contacts to track and/or monitor the movement of data more closely.

Advantageously, one or more aspects of the disclosure may enable an enterprise organization, as well as its employees, affiliates, and computer systems, to more effectively, efficiently, and securely manage how enterprise data is moved and/or managed, as illustrated in greater detail below.

In accordance with one or more embodiments, a data management computing platform having at least one processor, a memory, and a communication interface may receive, via the communication interface, one or more data packets associated with a movement of enterprise data intercepted by a filtering engine. Subsequently, the data management computing platform may evaluate the one or more data packets associated with the movement of enterprise data intercepted by the filtering engine based on at least one predefined data movement pattern. Thereafter, the data management computing platform may detect at least one variation from the at least one predefined data movement pattern based on the evaluating of the one or more data packets associated with the movement of enterprise data intercepted by the filtering engine. Then, the data management computing platform may send, via the communication interface, at least one alert message based on the detecting of the at least one variation from the at least one predefined data movement pattern.

In some embodiments, the data management computing platform may halt the movement of enterprise data based on the detecting of the at least one variation from the at least one predefined data movement pattern.

In some embodiments, the data management computing platform may update data movement history information based on the detecting of the at least one variation from the at least one predefined data movement pattern.

In some embodiments, the movement of enterprise data may be associated with a request to move enterprise information from a first computing device associated with an enterprise organization to a second computing device associated with the enterprise organization. In some instances, the filtering engine may run on the first computing device associated with the enterprise organization. In some instances, the filtering engine may run on the second computing device associated with the enterprise organization.

In some embodiments, the movement of enterprise data may be associated with a request to move enterprise information from a first computing device associated with an enterprise organization to a second computing device associated with an entity different from the enterprise organization. In some instances, the filtering engine may run on the first computing device associated with the enterprise organization. In some instances, the filtering engine may run on an intermediary system that is associated with the enterprise organization and configured to intercept outbound data packets.

In some embodiments, the at least one predefined data movement pattern may identify one or more timing considerations. In some instances, the evaluating of the one or more data packets associated with the movement of enterprise data intercepted by the filtering engine may include analyzing a timing of the movement of enterprise data intercepted by the filtering engine based on the one or more timing considerations.

In some embodiments, the at least one predefined data movement pattern may identify one or more size considerations. In some instances, the evaluating of the one or more data packets associated with the movement of enterprise data intercepted by the filtering engine may include analyzing a size of the movement of enterprise data intercepted by the filtering engine based on the one or more size considerations.

In some embodiments, the at least one predefined data movement pattern may identify one or more destination considerations. In some instances, the evaluating of the one or more data packets associated with the movement of enterprise data intercepted by the filtering engine may include analyzing a destination of the movement of enterprise data intercepted by the filtering engine based on the one or more destination considerations.

In some embodiments, sending the at least one alert message may include sending an alert message to a user of a computing device who initiated the movement of enterprise data intercepted by the filtering engine. In some instances, the alert message may be configured to notify the user of the computing device that the movement of enterprise data intercepted by the filtering engine varies from a predefined data movement pattern. In some instances, the alert message may be configured to prompt the user of the computing device to halt the movement of enterprise data intercepted by the filtering engine. In some instances, the alert message may be configured to prompt the user of the computing device to allow the movement of enterprise data intercepted by the filtering engine.

In some embodiments, sending the at least one alert message may include sending an alert message to one or more information security management users of one or more information security management computing devices associated with an enterprise organization.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4C depict an illustrative event sequence for managing enterprise data movement using a heuristic data movement detection engine in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
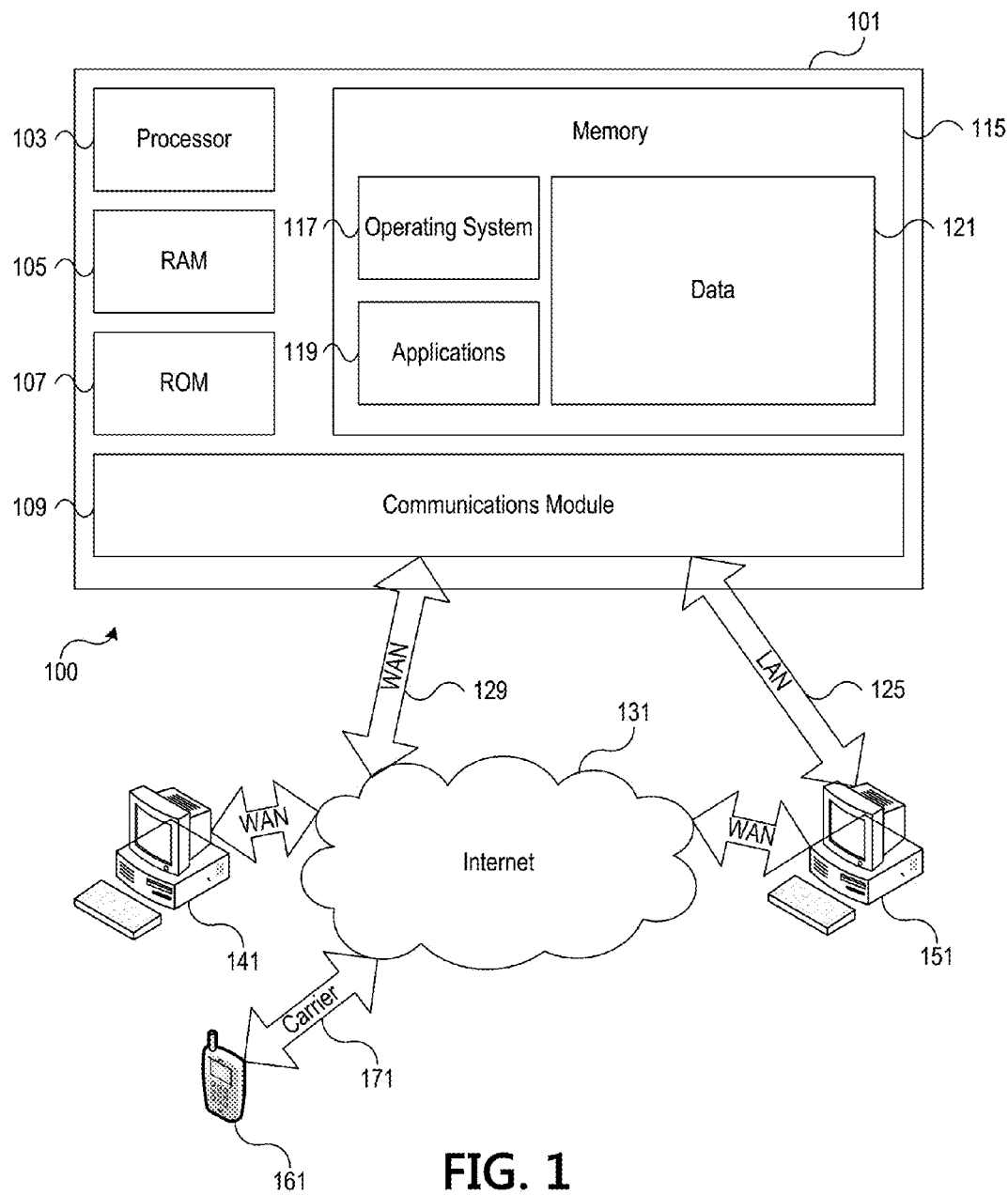
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware.

Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
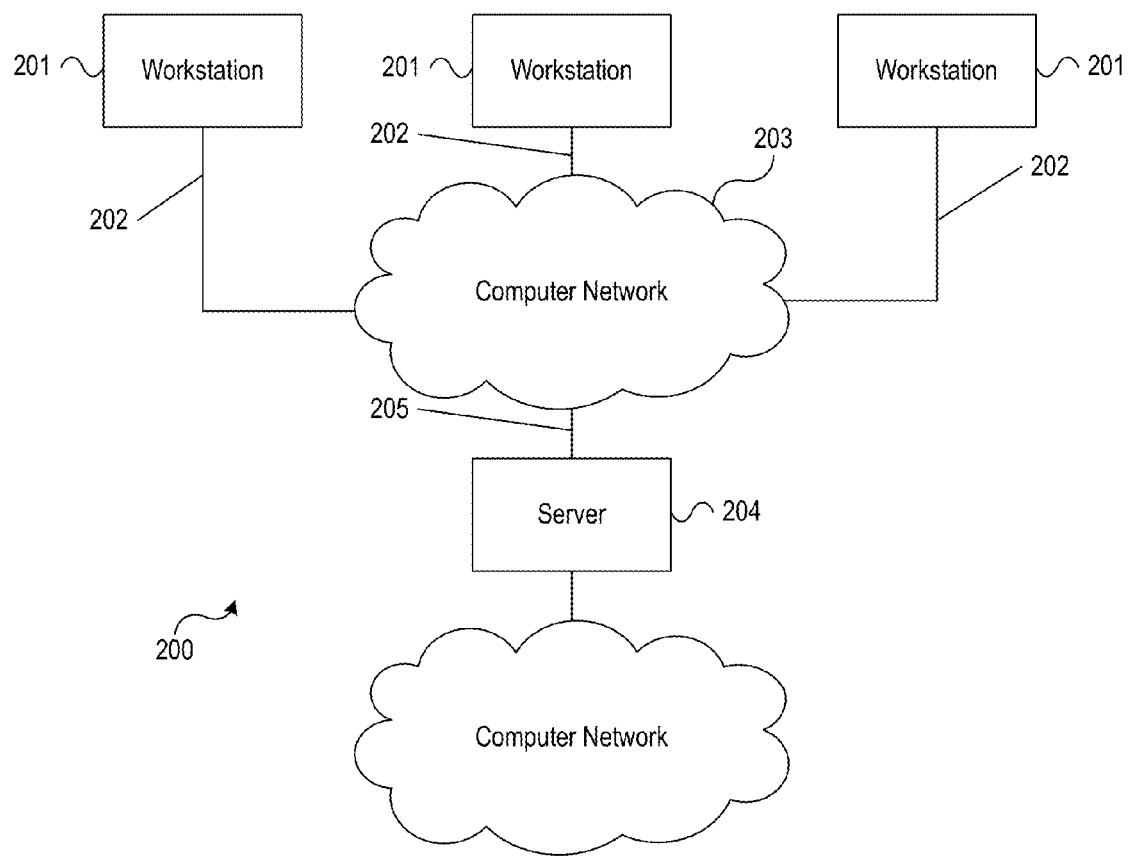
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
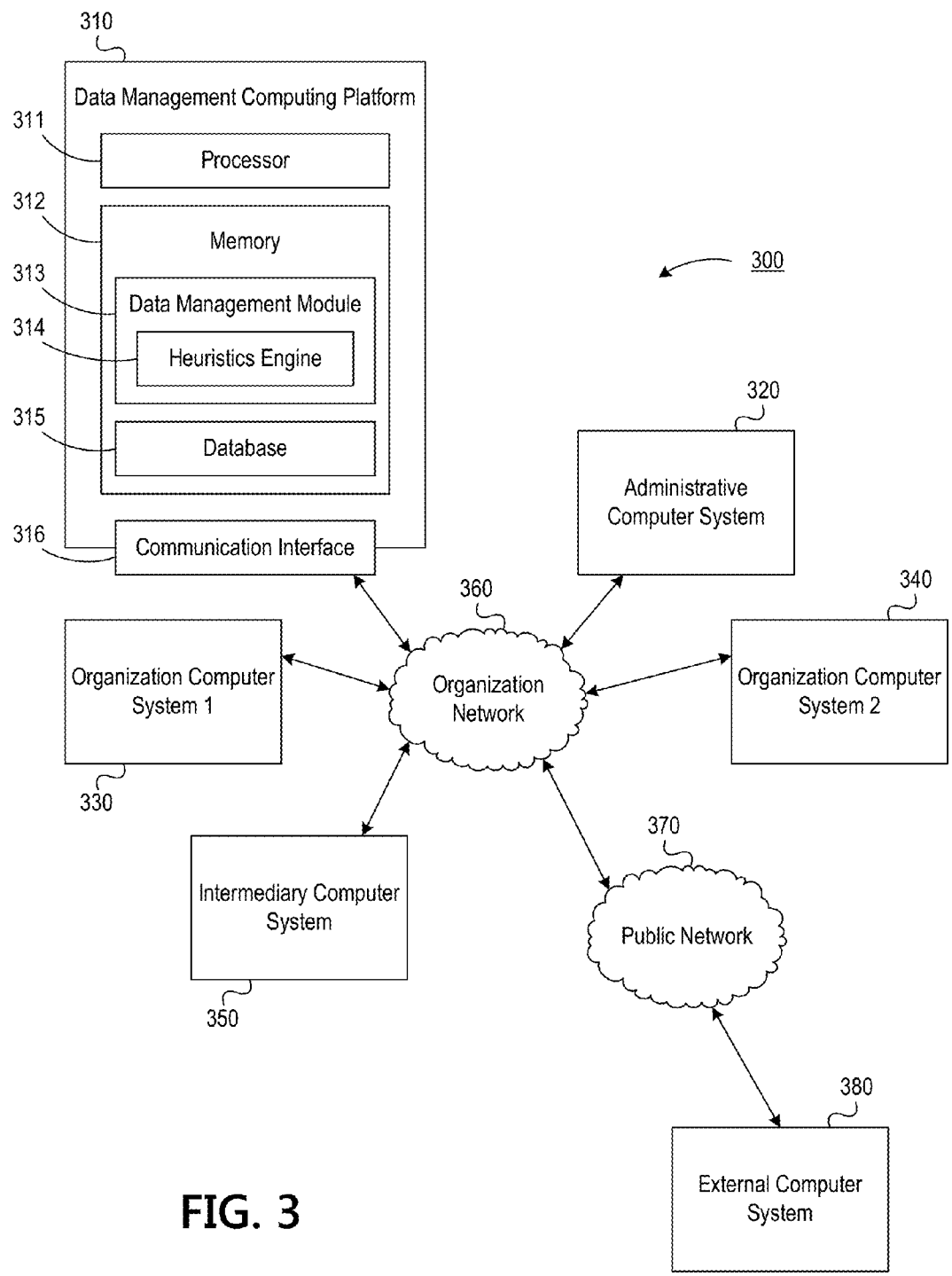
FIG. 3 depicts an illustrative computing environment for managing enterprise data movement using a heuristic data movement detection engine in accordance with one or more example embodiments.

FIG. 3 depicts an illustrative computing environment for managing enterprise data movement using a heuristic data movement detection engine in accordance with one or more example embodiments. Referring to FIG. 3, computing environment 300 may include one or more computing devices. For example, computing environment 300 may include an administrative computer system 320, a first organization computer system 330, a second organization computer system 340, an intermediary computer system 350, and an external computer system 380. Administrative computer system 320 may, for example, be used by and/or configured to be used by an administrative user of an organization, such as an administrative user of a financial institution and/or an administrative user of a particular business unit of a financial institution. Organization computer system 330 may, for example, create, store, manipulate, manage, provide access to, and/or otherwise maintain enterprise information, such as one or more enterprise data sets. In some instances, organization computer system 330 also may run and/or otherwise execute a filtering engine (which may, e.g., be configured to detect and/or intercept one or more movements of data to and/or from organization computer system 330). Organization computer system 340 also may, for example, create, store, manipulate, manage, provide access to, and/or otherwise maintain enterprise information, such as one or more enterprise data sets. In addition, organization computer system 340 may, in some instances, run and/or otherwise execute a filtering engine (which may, e.g., be configured to detect and/or intercept one or more movements of data to and/or from organization computer system 340). Intermediary computer system 350 may, for example, monitor and/or track movements of data into and/or out of one or more computer systems of an organization from one or more external computer systems (which may, e.g., be operated by, used by, and/or otherwise associated with one or more entities different from the organization). In addition, intermediary computer system 350 may, in some instances, run and/or otherwise execute a filtering engine (which may, e.g., be configured to detect and/or intercept one or more movements of data to and/or from one or more organization computer systems to one or more external computer systems not associated with the organization operating intermediary computer system 350). External computer system 380 may, for example, be owned by, operated by, maintained by, used by, and/or otherwise associated with one or more entities different from the organization that may own, operate, maintain, and/or use administrative computer system 320, organization computer system 330, organization computer system 340, and intermediary computer system 350. In some instances, external computer system 380 may send enterprise information to one or more of administrative computer system 320, organization computer system 330, organization computer system 340, and intermediary computer system 350 and/or receive enterprise information from one or more of administrative computer system 320, organization computer system 330, organization computer system 340, and intermediary computer system 350, as illustrated in greater detail below.

Administrative computer system 320, organization computer system 330, organization computer system 340, intermediary computer system 350, and external computer system 380 may be any type of computing device capable of receiving a user interface, receiving input via the user interface, and communicating the received input to one or more other computing devices. For example, administrative computer system 320, organization computer system 330, organization computer system 340, intermediary computer system 350, and external computer system 380 may be a server computer, a desktop computer, laptop computer, tablet computer, smart phone, or the like. As noted above, and as illustrated in greater detail below, any and/or all of administrative computer system 320, organization computer system 330, organization computer system 340, intermediary computer system 350, and external computer system 380 may, in some instances, be special-purpose computing devices configured to perform specific functions.

Computing environment 300 also may include one or more computing platforms. For example, computing environment 300 may include data management computing platform 310. Data management computing platform 310 may include one or more computing devices configured to perform one or more of the functions described herein. For example, data management computing platform 310 may include one or more computers (e.g., laptop computers, desktop computers, servers, server blades, or the like).

Computing environment 300 also may include one or more networks, which may interconnect one or more of data management computing platform 310, administrative computer system 320, organization computer system 330, organization computer system 340, intermediary computer system 350, and external computer system 380. For example, computing environment 300 may include organization network 360 and public network 370. Organization network 360 and/or public network 370 may include one or more sub-networks (e.g., LANs, WANs, or the like). Organization network 360 may be associated with a particular organization (e.g., a corporation, financial institution, educational institution, governmental institution, or the like) and may interconnect one or more computing devices associated with the organization. For example, data management computing platform 310, administrative computer system 320, organization computer system 330, organization computer system 340, and intermediary computer system 350 be associated with an organization (e.g., a financial institution), and organization network 360 may be associated with and/or operated by the organization, and may include one or more networks (e.g., LANs, WANs, VPNs, or the like) that interconnect data management computing platform 310, administrative computer system 320, organization computer system 330, organization computer system 340, and intermediary computer system 350 and one or more other computing devices and/or computer systems that are used by, operated by, and/or otherwise associated with the organization. Public network 370 may connect organization network 360 and/or one or more computing devices connected thereto (e.g., data management computing platform 310, administrative computer system 320, organization computer system 330, organization computer system 340, and intermediary computer system 350) with one or more networks and/or computing devices that are not associated with the organization. For example, external computer system 380 might not be associated with an organization that operates organization network 360 (e.g., because external computer system 380 may be owned and/or operated by one or more entities different from the organization that operates organization network 360, rather than being owned and/or operated by the organization itself or an employee or affiliate of the organization), and public network 370 may include one or more networks (e.g., the internet) that connect external computer system 380 to organization network 360 and/or one or more computing devices connected thereto (e.g., data management computing platform 310, administrative computer system 320, organization computer system 330, organization computer system 340, and intermediary computer system 350).

Data management computing platform 310 may include one or more processors 311, memory 312, and communication interface 316. A data bus may interconnect processor(s) 311, memory 312, and communication interface 316. Communication interface 316 may be a network interface configured to support communication between data management computing platform 310 and organization network 360 and/or one or more sub-networks thereof. Memory 312 may include one or more program modules having instructions that when executed by processor(s) 311 cause data management computing platform 310 to perform one or more functions described herein and/or one or more databases that may store and/or otherwise maintain information which may be used by such program modules and/or processor(s) 311. For example, memory 312 may include data management module 313, which may include instructions that when executed by processor(s) 311 cause data management computing platform 310 to perform one or more functions described herein, such as instructions for managing enterprise data movement, as illustrated in greater detail below. For instance, data management module 313 may include executable instructions for and/or otherwise provide a data movement heuristics engine 314, which may be used in analyzing the movement of enterprise data based on one or more registered and/or learned data movement patterns, as illustrated in greater detail below. In addition, memory 312 may include a data management database 315, which may store information defining one or more registered and/or learned data movement patterns and/or other information that may be used by data management computing platform 310 and/or heuristics engine 314 in managing enterprise data movement.

Figure 4A:
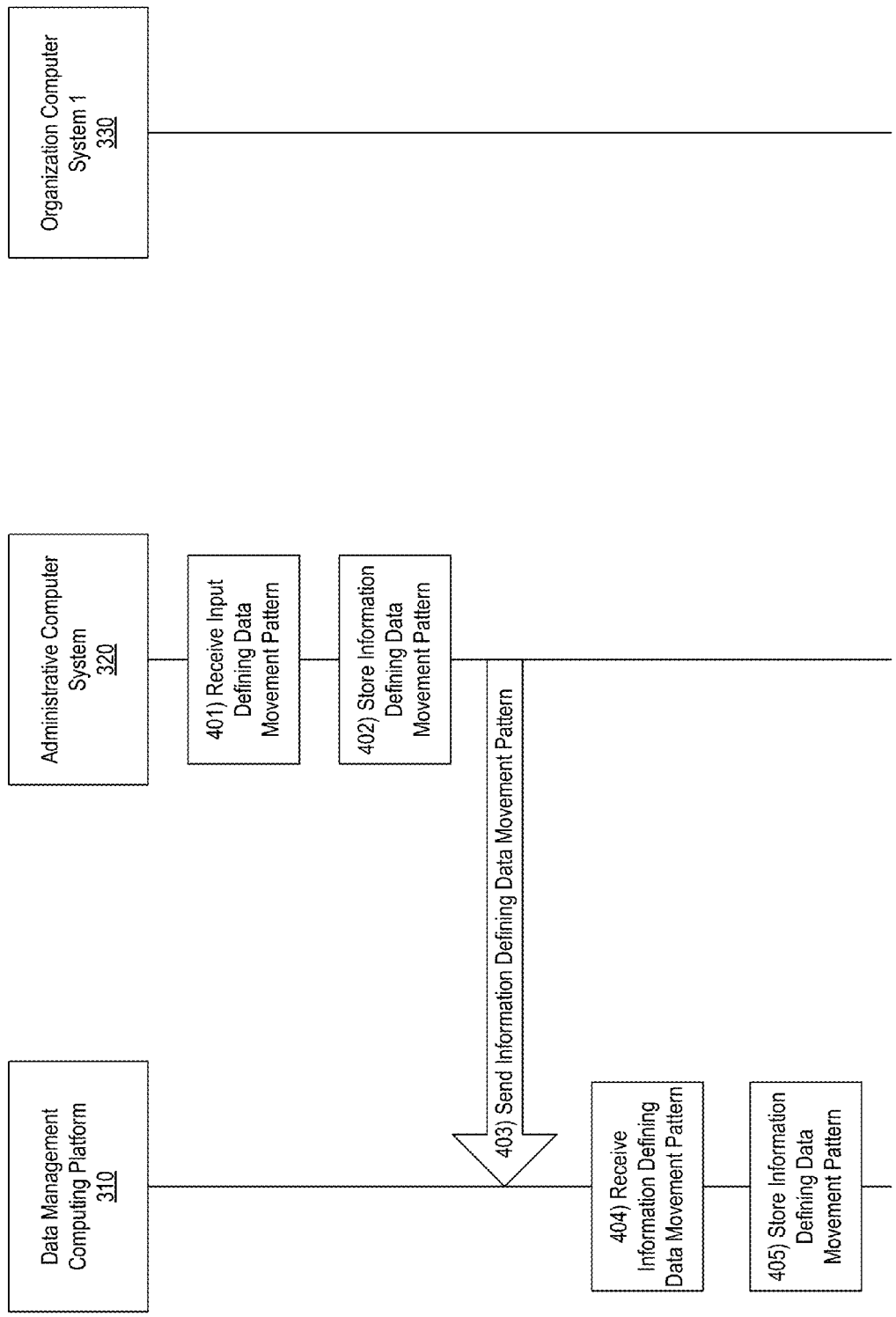

FIGS. 4A-4C depict an illustrative event sequence for managing enterprise data movement using a heuristic data movement detection engine in accordance with one or more example embodiments. Referring to FIG. 4A, at step 401, administrative computer system 320 may receive input defining a data movement pattern. For example, at step 401, administrative computer system 320 may receive input (e.g., from the user of administrative computer system 320 who may, e.g., be an enterprise data movement manager and/or otherwise be an administrative user associated with an organization operating data management computing platform 310 and/or administrative computer system 320), and such input may include information defining a data movement pattern to be registered (e.g., with data management computing platform 310, as illustrated in greater detail below). For example, the input may, for instance, include information identifying an acceptable type of data to be moved, an acceptable timing for such data to be moved, an acceptable amount or size of such data to be moved, an acceptable destination to which such data may be moved, and/or other information that identifies and/or otherwise defines an acceptable data movement pattern.

At step 402, administrative computer system 320 may store information defining the data movement pattern. For example, at step 402, administrative computer system 320 may store the information received from the user of administrative computer system 320 at step 401 and/or other information defining the data movement pattern identified at step 401. At step 403, administrative computer system 320 may send information defining the data movement pattern to data management computing platform 310. For example, at step 403, administrative computer system 320 may send to data management computing platform 310 the information stored at step 402 defining the data movement pattern, so as to enable data management computing platform 310 to register the data movement pattern as an acceptable data movement pattern, as illustrated in greater detail below.

At step 404, data management computing platform 310 may receive information defining the data movement pattern from administrative computer system 320. For example, at step 404, data management computing platform 310 may receive from administrative computer system 320 the information defining the data movement pattern to be registered with data management computing platform 310 (e.g., as an acceptable data movement pattern). At step 405, data management computing platform 310 may store information defining the data movement pattern. For example, at step 405, data management computing platform 310 may store the information received from administrative computer system 320 at step 404 and/or other information defining the data movement pattern associated with such information. In storing information defining the data movement pattern (e.g., at step 405), data management computing platform 310 may, for example, update and/or store information in one or more databases (e.g., data management database 315), create and/or update one or more configuration files used by data management computing platform 310 and/or heuristics engine 314, and/or otherwise store information defining the data movement pattern. Additionally or alternatively, in storing information defining the data movement pattern (e.g., at step 405), data management computing platform 310 may store information identifying an acceptable type of data to be moved, an acceptable timing for such data to be moved, an acceptable amount or size of such data to be moved, an acceptable destination to which such data may be moved, and/or other information that identifies and/or otherwise defines the data movement pattern. For instance, different data movement patterns may be defined for movements of data that involve different types of data, different timings, different amounts of data, different source and/or destination systems, and/or other various considerations. Data management computing platform 310 may, for instance, store and/or maintain any and/or all of this information, for example, in data management database 315, and heuristics engine 314 may access and/or use any and/or all of this information in analyzing data movement, as illustrated in greater detail below.

Referring to FIG. 4B, at step 406, organization computer system 330 may receive a command to move data to an internal computer system. For example, organization computer system 330 may be used by, operated by, maintained by, and/or otherwise associated with an enterprise organization (e.g., a financial institution, as discussed above), and at step 406, organization computer system 330 may receive a command to move data from organization computer system 330 to another computer system that is used by, operated by, maintained by, and/or otherwise associated with the same enterprise organization. For instance, at step 406, organization computer system 330 may receive a command to move enterprise data from organization computer system 330 to organization computer system 340, and organization computer system 340 may, for instance, be associated with the same organization as organization computer system 330. At step 407, organization computer system 330 may prepare the data for movement to the internal computer system. For example, at step 407, in preparing the data for movement to the internal computer system, organization computer system 330 may load and/or package the enterprise data to be moved from organization computer system 330 to organization computer system 340 and/or otherwise prepare such data for movement from organization computer system 330 to organization computer system 340.

At step 408, organization computer system 330 may initiate the movement of data to the internal computer system. For example, at step 408, in initiating the movement of data to the internal computer system, organization computer system 330 may connect to and/or being transmitting to organization computer system 340 the enterprise data to be moved from organization computer system 330 to organization computer system 340.

At step 409, data management computing platform 310 may receive, from a filtering engine, data that is associated with the movement of data initiated by organization computer system 330. For example, at step 409, data management computing platform 310 may receive, via the communication interface (e.g., communication interface 316), one or more data packets associated with a movement of enterprise data intercepted by a filtering engine. The one or more data packets received by data management computing platform 310 at step 409 may, for instance, include all or part of the data to be moved from organization computer system 330 to organization computer system 340 and may be sent to data management computing platform 310 by a filtering engine that intercepts the data packets prior to or as the data packets are being sent from organization computer system 330 to organization computer system 340. In some instances, the initiation of the movement of data may be detected by a filtering engine on organization computer system 330, and the data packets received by data management computing platform 310 at step 409 may be received from the filtering engine on organization computer system 330. In other instances, the initiation of the movement of data may be detected by a filtering engine on the destination computer system (e.g., organization computer system 340), and the data packets received by data management computing platform 310 at step 409 may be received from the filtering engine on organization computer system 340.

In some embodiments, the movement of enterprise data may be associated with a request to move enterprise information from a first computing device associated with an enterprise organization to a second computing device associated with the enterprise organization. For example, the movement of enterprise data (e.g., for which data management computing platform 310 may receive one or more data packets and/or other information at step 409) may correspond to and/or otherwise be associated with a request (e.g., initiated by the user of organization computer system 330) to move enterprise information from one computer system (e.g., organization computer system 330) to another computer system (e.g., organization computer system 340) that is used by, operated by, maintained by, and/or otherwise associated with the same enterprise organization.

In these embodiments, in some instances, the filtering engine may run on the first computing device associated with the enterprise organization. For example, the filtering engine may run on organization computer system 330, and the data packets associated with the movement of data may be intercepted at the source system (e.g., at organization computer system 330). In other instances, the filtering engine may run on the second computing device associated with the enterprise organization. For example, the filtering engine may run on organization computer system 340, and the data packets associated with the movement of data may be intercepted at the destination system (e.g., at organization computer system 340).

In some embodiments, the movement of enterprise data may be associated with a request to move enterprise information from a first computing device associated with an enterprise organization to a second computing device associated with an entity different from the enterprise organization. For example, the movement of enterprise data (e.g., for which data management computing platform 310 may receive one or more data packets and/or other information) may correspond to and/or otherwise be associated with a request (e.g., initiated by the user of organization computer system 330) to move enterprise information from one computer system within an organization (e.g., organization computer system 330) to another computer system outside of the organization (e.g., external computer system 380), as discussed in greater detail below in connection with FIGS. 5A-5C.

In these embodiments, in some instances, the filtering engine may run on the first computing device associated with the enterprise organization. For example, the filtering engine may run on organization computer system 330, and the data packets associated with the movement of data may be intercepted at the source system (e.g., at organization computer system 330). In other instances, the filtering engine may run on an intermediary system that is associated with the enterprise organization and configured to intercept outbound data packets. For example, the filtering engine may run on intermediary computer system 350, and the data packets associated with the movement of data may be intercepted at the intermediary system (e.g., at intermediary computer system 350). In these instances, intermediary computer system 350 may, for example, be configured to intercept all outbound data packets send from computer systems associated with the organization to external computer systems, such as external computer system 380. Additionally or alternatively, intermediary computer system 350 may, for example, be configured to intercept all inbound data packets sent to computer systems associated with the organization from external computer systems, such as external computer system 380.

At step 410, data management computing platform 310 may evaluate the data received from the filtering engine based on one or more data movement patterns. For example, at step 410, data management computing platform 310 may evaluate the one or more data packets associated with the movement of enterprise data intercepted by the filtering engine based on at least one predefined data movement pattern. In evaluating the one or more data packets (e.g., at step 410), data management computing platform 310 and/or heuristics engine 314 may, for example, inspect the enterprise information contained in and/or otherwise associated with such packets to check the contents of such enterprise information and/or match such contents against one or more rules defined by and/or otherwise associated with one or more acceptable data movement patterns and/or unacceptable data movement patterns (which may, e.g., be stored by data management computing platform 310 in database 315). For example, one or more data movement patterns may define rules governing how account numbers, social security numbers, and/or other specific types of enterprise data may be transmitted between different computer systems, and data management computing platform 310 and/or heuristics engine 314 may, at step 410, inspect the data packets to determine if they include such account numbers, social security numbers, and/or other specific types of enterprise data and then apply any applicable rules defined by the one or more data movement patterns accordingly.

Additionally or alternatively, data management computing platform 310 and/or heuristics engine 314 may analyze the timing of the transmission of such packets based on the one or more rules defined by and/or otherwise associated with one or more acceptable data movement patterns and/or unacceptable data movement patterns. Additionally or alternatively, data management computing platform 310 and/or heuristics engine 314 may analyze the amount and/or size of the transmission of such packets based on the one or more rules defined by and/or otherwise associated with one or more acceptable data movement patterns and/or unacceptable data movement patterns. Additionally or alternatively, data management computing platform 310 and/or heuristics engine 314 may analyze the destination and/or target for the transmission of such packets based on the one or more rules defined by and/or otherwise associated with one or more acceptable data movement patterns and/or unacceptable data movement patterns. As discussed above, the one or more data movement patterns (which may, e.g., be used by data management computing platform 310 in evaluating the one or more data packets at step 410) may include one or more data movements patterns that were previously registered with data management computing platform 310 and/or one or more data movement patterns that were previously learned by data management computing platform 310 based on one or more previous movements of data (which may, e.g., have been deemed acceptable or unacceptable by one or more administrative users, such as the user of administrative computer system 320).

In some embodiments, the at least one predefined data movement pattern may identify one or more timing considerations, and the evaluating of the one or more data packets associated with the movement of enterprise data intercepted by the filtering engine may include analyzing a timing of the movement of enterprise data intercepted by the filtering engine based on the one or more timing considerations. For example, in some instances, a data movement pattern defined in database 315 and/or used by data management computing platform 310 and/or heuristics engine 314 may identify one or more timing considerations for identifying acceptable and/or unacceptable movements of enterprise data, and in evaluating the data received from the filtering engine at step 410, data management computing platform 310 and/or heuristics engine 314 may analyze the timing of the transmission of such data based on the one or more timing considerations identified by the data movement pattern.

In some embodiments, the at least one predefined data movement pattern may identify one or more size considerations, and the evaluating of the one or more data packets associated with the movement of enterprise data intercepted by the filtering engine may include analyzing a size of the movement of enterprise data intercepted by the filtering engine based on the one or more size considerations. For example, in some instances, a data movement pattern defined in database 315 and/or used by data management computing platform 310 and/or heuristics engine 314 may identify one or more size considerations for identifying acceptable and/or unacceptable movements of enterprise data, and in evaluating the data received from the filtering engine at step 410, data management computing platform 310 and/or heuristics engine 314 may analyze the amount and/or size of the data being moved based on the one or more size considerations identified by the data movement pattern.

In some embodiments, the at least one predefined data movement pattern may identify one or more destination considerations, and the evaluating of the one or more data packets associated with the movement of enterprise data intercepted by the filtering engine may include analyzing a destination of the movement of enterprise data intercepted by the filtering engine based on the one or more destination considerations. For example, in some instances, a data movement pattern defined in database 315 and/or used by data management computing platform 310 and/or heuristics engine 314 may identify one or more destination considerations for identifying acceptable and/or unacceptable movements of enterprise data, and in evaluating the data received from the filtering engine at step 410, data management computing platform 310 and/or heuristics engine 314 may analyze the destination and/or target to which the data is being moved based on the one or more destination considerations identified by the data movement pattern.

Referring to FIG. 4C, at step 411, data management computing platform 310 may detect one or more variations from the one or more data movement patterns. For example, at step 411, data management computing platform 310 may detect at least one variation from the at least one predefined data movement pattern based on the evaluating of the one or more data packets associated with the movement of enterprise data intercepted by the filtering engine. For instance, data management computing platform 310 may, at step 411, detect one or more variations based on the evaluation performed at step 410. If data management computing platform 310 does not detect a variation at step 410, data management computing platform 310 might take no action with respect to the movement of enterprise data and/or otherwise allow the movement of enterprise data to continue (e.g., so as to allow organization computer system 330 to complete the movement of enterprise data to organization computer system 340). In some instances, when and/or after allowing the movement of enterprise data to continue, data management computing platform 310 may compute a checksum using any and/or all of the enterprise data, and when receiving the enterprise data from organization computer system 330, organization computer system 340 likewise may compute a checksum using any and/or all of the enterprise data, and organization computer system 340 subsequently may provide the checksum to data management computing platform 310 to confirm that the enterprise data received by organization computer system 340 matches the enterprise data evaluated by data management computing platform 310 (e.g., at step 410).

At step 412, data management computing platform 310 may send one or more alerts based on detecting the one or more variations. For example, at step 412, data management computing platform 310 may send, via the communication interface (e.g., communication interface 316), at least one alert message based on the detecting of the at least one variation from the at least one predefined data movement pattern. For instance, at step 412, data management computing platform 310 may send one or more alert messages to organization computer system 330 and/or the user of organization computer system 330, organization computer system 340 and/or the user of organization computer system 340, administrative computer system 320 and/or the user of administrative computer system 320, one or more administrative users, an information security team, and/or to one or more other users and/or devices. The one or more alert messages may, for instance, be configured to cause one or more recipient devices to present notifications indicating that the movement of enterprise data does not match a predefined data movement pattern, prompts asking users whether to stop the transfer of the enterprise data, and/or other information associated with the one or more detected variations.

In some embodiments, sending the at least one alert message may include sending an alert message to a user of a computing device who initiated the movement of enterprise data intercepted by the filtering engine. For example, in sending the at least one alert message (e.g., at step 412), data management computing platform 310 may send an alert message to the user of organization computer system 330, as the user of organization computer system 330 may have initiated the movement of enterprise data for which the variation was detected (e.g., at step 411).

Figure 6:
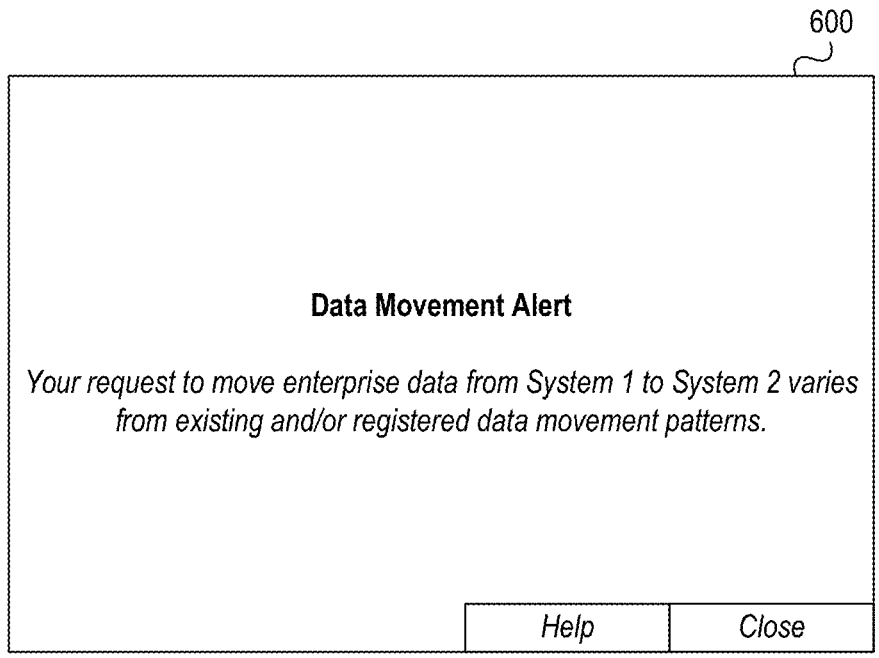
FIGS. 6-9 depict example graphical user interfaces for managing enterprise data movement using a heuristic data movement detection engine in accordance with one or more example embodiments.
Figure 7:
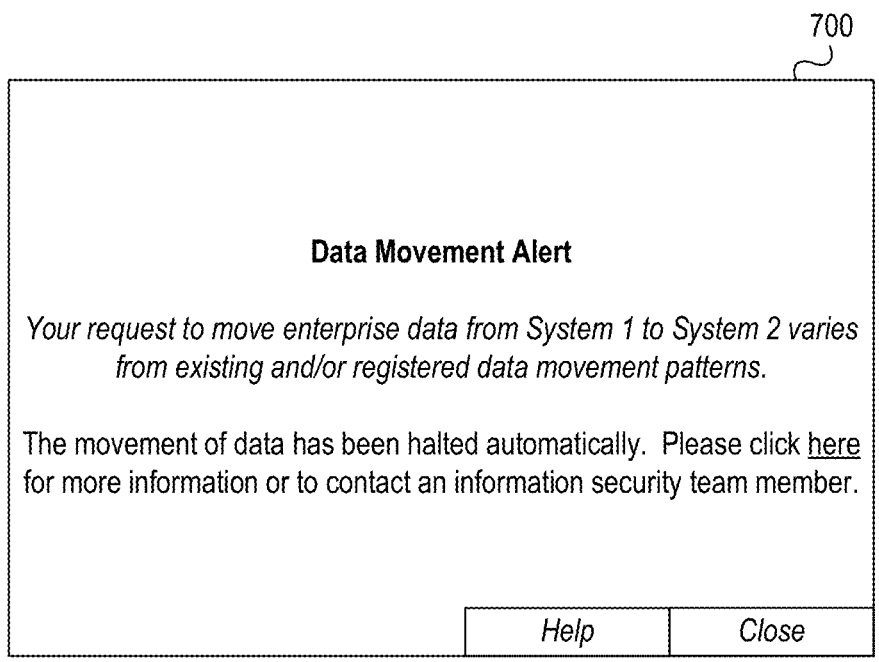

In some instances, the alert message may be configured to notify the user of the computing device that the movement of enterprise data intercepted by the filtering engine varies from a predefined data movement pattern. For example, the alert message may be configured to notify the user of organization computer system 330 that the movement of enterprise data intercepted by the filtering engine and evaluated by data management computing platform 310 varies from one or more predefined data movement patterns. After data management computing platform 310 sends such an alert message to organization computer system 330, organization computer system 330 may, for instance, receive the alert message and/or present one or more graphical user interfaces based on the alert message. For example, after receiving an alert message from data management computing platform 310, organization computer system 330 may display, cause to be displayed, and/or otherwise present a graphical user interface similar to graphical user interface 600, which is illustrated in FIG. 6. As seen in FIG. 6, graphical user interface 600 may include text and/or other information indicating that a movement of enterprise data requested by and/or initiated by the user of organization computer system 330 varies from one or more predefined data movement patterns. As another example, after receiving an alert message from data management computing platform 310, organization computer system 330 may display, cause to be displayed, and/or otherwise present a graphical user interface similar to graphical user interface 700, which is illustrated in FIG. 7. As seen in FIG. 7, graphical user interface 700 may include text and/or other information indicating that a movement of enterprise data requested by and/or initiated by the user of organization computer system 330 varies from one or more predefined data movement patterns and has been halted accordingly (e.g., by data management computing platform 310).

Figure 8:
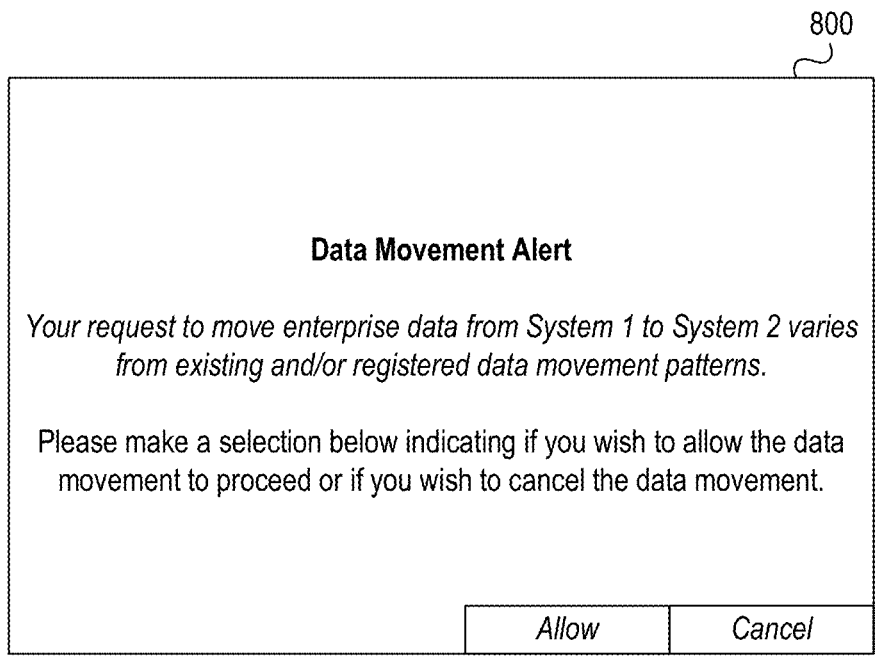

In some instances, the alert message may be configured to prompt the user of the computing device to halt the movement of enterprise data intercepted by the filtering engine or to allow the movement of enterprise data intercepted by the filtering engine. For example, the alert message may be configured to notify the user of organization computer system 330 that the movement of enterprise data intercepted by the filtering engine and evaluated by data management computing platform 310 varies from one or more predefined data movement patterns and may be further configured to prompt the user of organization computer system 330 to allow or cancel the movement of enterprise data accordingly. After data management computing platform 310 sends such an alert message to organization computer system 330, organization computer system 330 may, for instance, receive the alert message and/or present one or more graphical user interfaces based on the alert message. For example, after receiving an alert message from data management computing platform 310, organization computer system 330 may display, cause to be displayed, and/or otherwise present a graphical user interface similar to graphical user interface 800, which is illustrated in FIG. 8. As seen in FIG. 8, graphical user interface 800 may include text and/or other information indicating that a movement of enterprise data requested by and/or initiated by the user of organization computer system 330 varies from one or more predefined data movement patterns and prompting the user of organization computer system 330 to make a selection indicative of whether or not to allow the movement of enterprise data to proceed and/or otherwise be completed.

Figure 9:
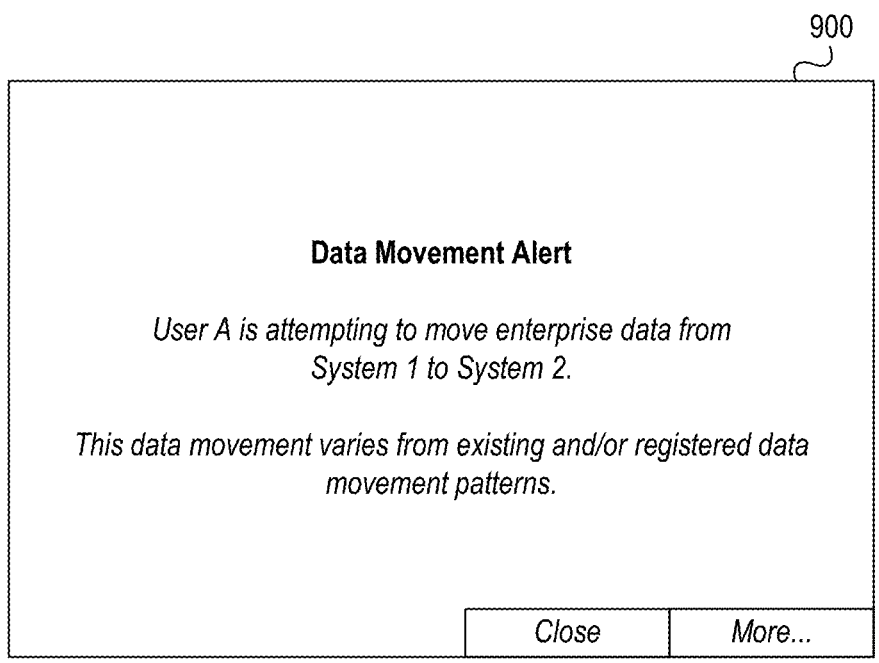

In some embodiments, sending the at least one alert message may include sending an alert message to one or more information security management users of one or more information security management computing devices associated with an enterprise organization. For example, in sending the at least one alert message (e.g., at step 412), data management computing platform 310 may send an alert message to one or more information security management users of one or more information security management computing devices, such as an administrative user of administrative computer system 320. After data management computing platform 310 sends such an alert message to administrative computer system 320, administrative computer system 320 may, for instance, receive the alert message and/or present one or more graphical user interfaces based on the alert message. For example, after received the alert message from data management computing platform 310, administrative computer system 320 may display, cause to be displayed, and/or otherwise present a graphical user interface similar to graphical user interface 900, which is illustrated in FIG. 9. As seen in FIG. 9, graphical user interface 900 may include text and/or other information indicating that a movement of enterprise data requested by and/or initiated by a particular user varies from one or more predefined data movement patterns.

At step 413, data management computing platform 310 may halt the movement of data. For example, at step 413, data management computing platform 310 may halt the movement of enterprise data based on the detecting of the at least one variation from the at least one predefined data movement pattern. In halting the movement of enterprise data (e.g., at step 413), data management computing platform 310 may, for example, send one or more commands to the source computer system (e.g., organization computer system 330) to stop the transfer of the data, intercept and/or block the one or more data packets from being received by the destination computer system (e.g., organization computer system 340), and/or otherwise prevent the enterprise data from being moved from the source computer system (e.g., organization computer system 330) to the destination computer system (e.g., organization computer system 340).

At step 414, data management computing platform 310 may update data movement history information. For example, at step 414, data management computing platform 310 may update data movement history information based on the detecting of the at least one variation from the at least one predefined data movement pattern. In updating data movement history information (e.g., at step 414), data management computing platform 310 may, for example, update information in database 315 (which may, e.g., enable adaptive learning of one or more new data movement patterns). For instance, based on the occurrence of the movement of enterprise data (e.g., from organization computer system 330 to organization computer system 340) and/or based on any subsequent input received in connection with the movement of enterprise data (e.g., input from the user of the source computer system or the destination computer system allowing the movement of enterprise data to proceed even after a variation from a predefined data movement pattern is detected, input from an administrative user allowing the movement of enterprise data to proceed even after a variation from a predefined data movement pattern is detected, or the like), data management computing platform 310 may create and/or update one or more data movement patterns in database 315 (e.g., so as to allow data movement patterns matching the current movement of enterprise data to proceed without being identified as variations in the future).

Figure 5A:
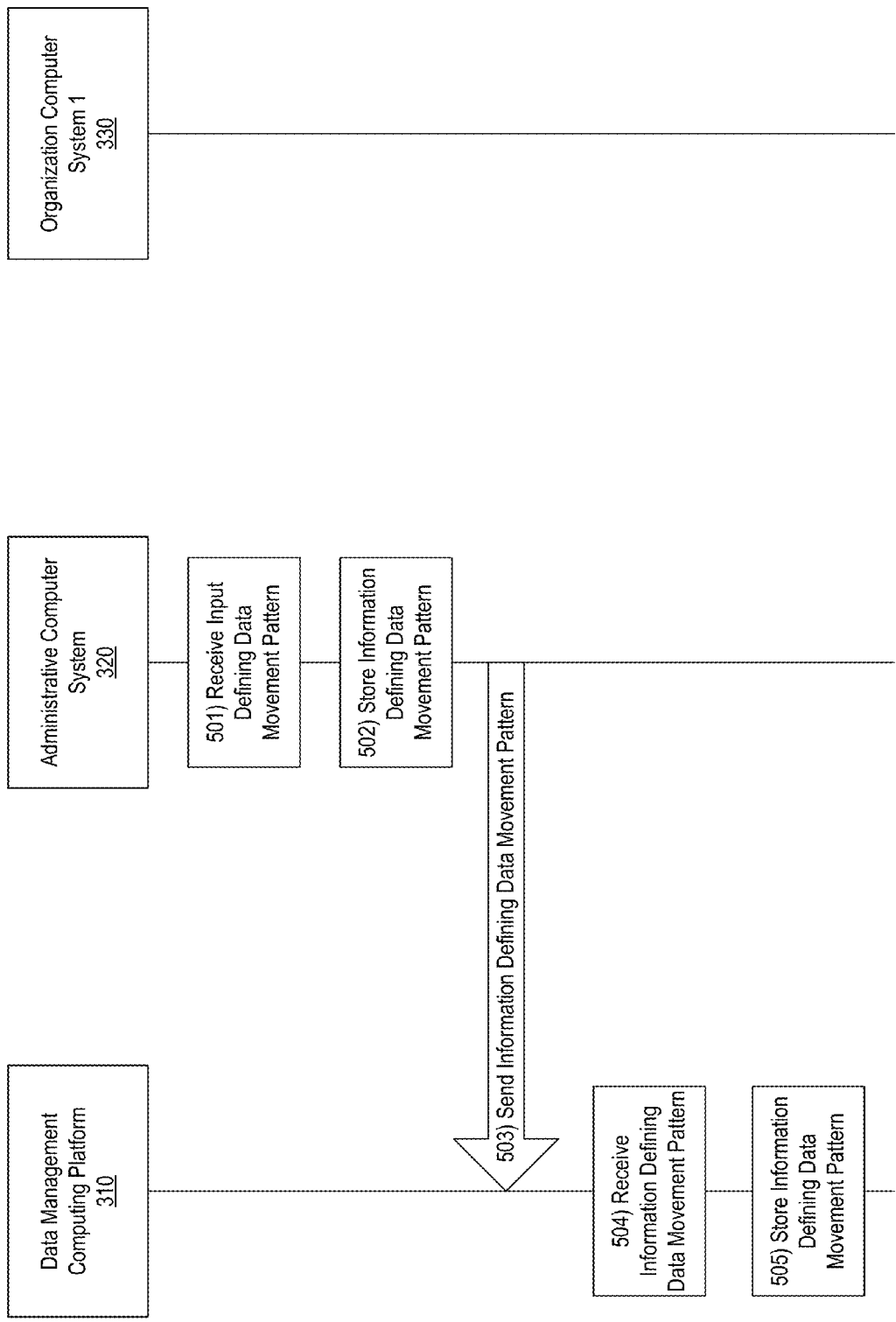
FIGS. 5A-5C depict another illustrative event sequence for managing enterprise data movement using a heuristic data movement detection engine in accordance with one or more example embodiments.
Figure 5B:
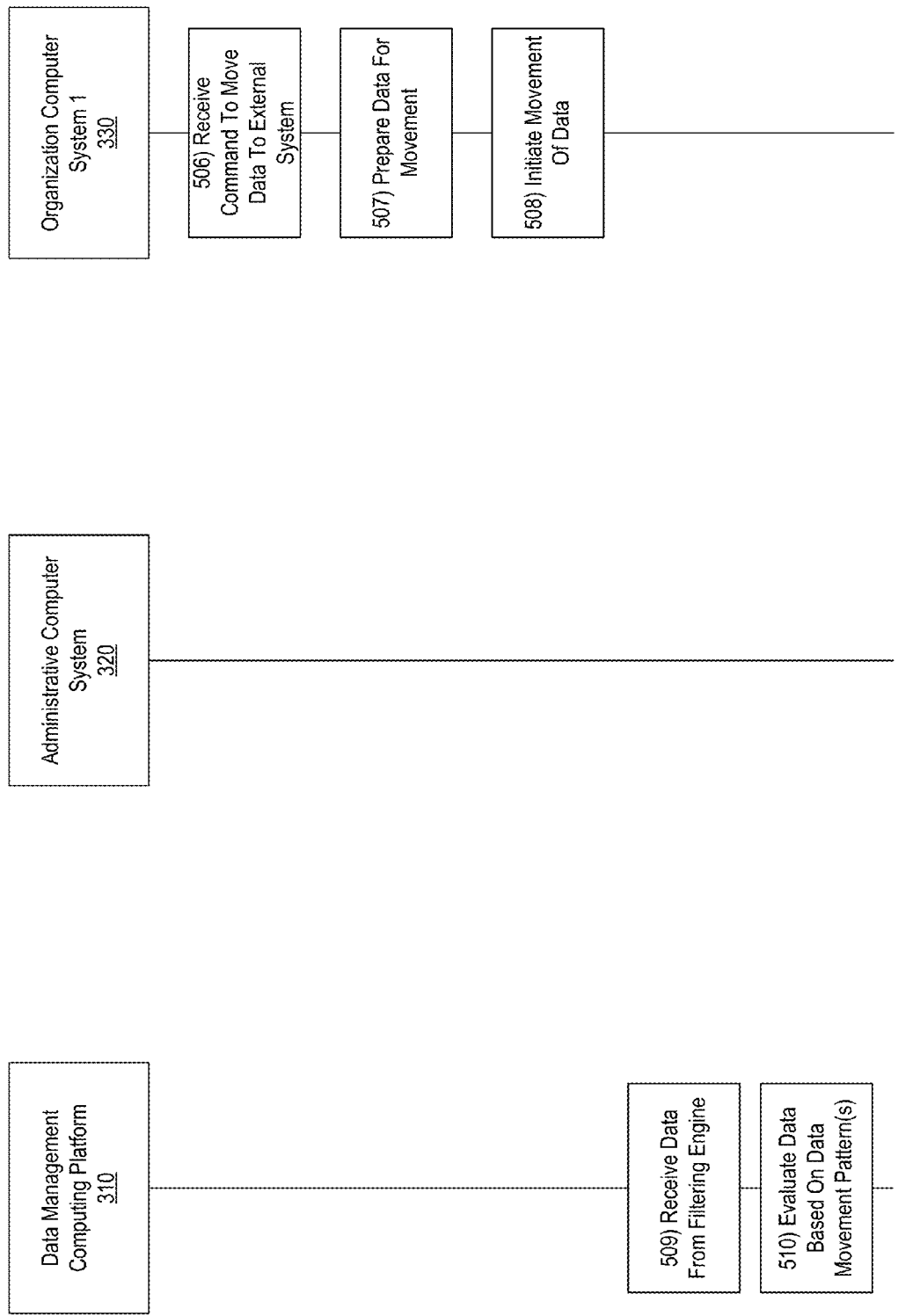
Figure 5C:
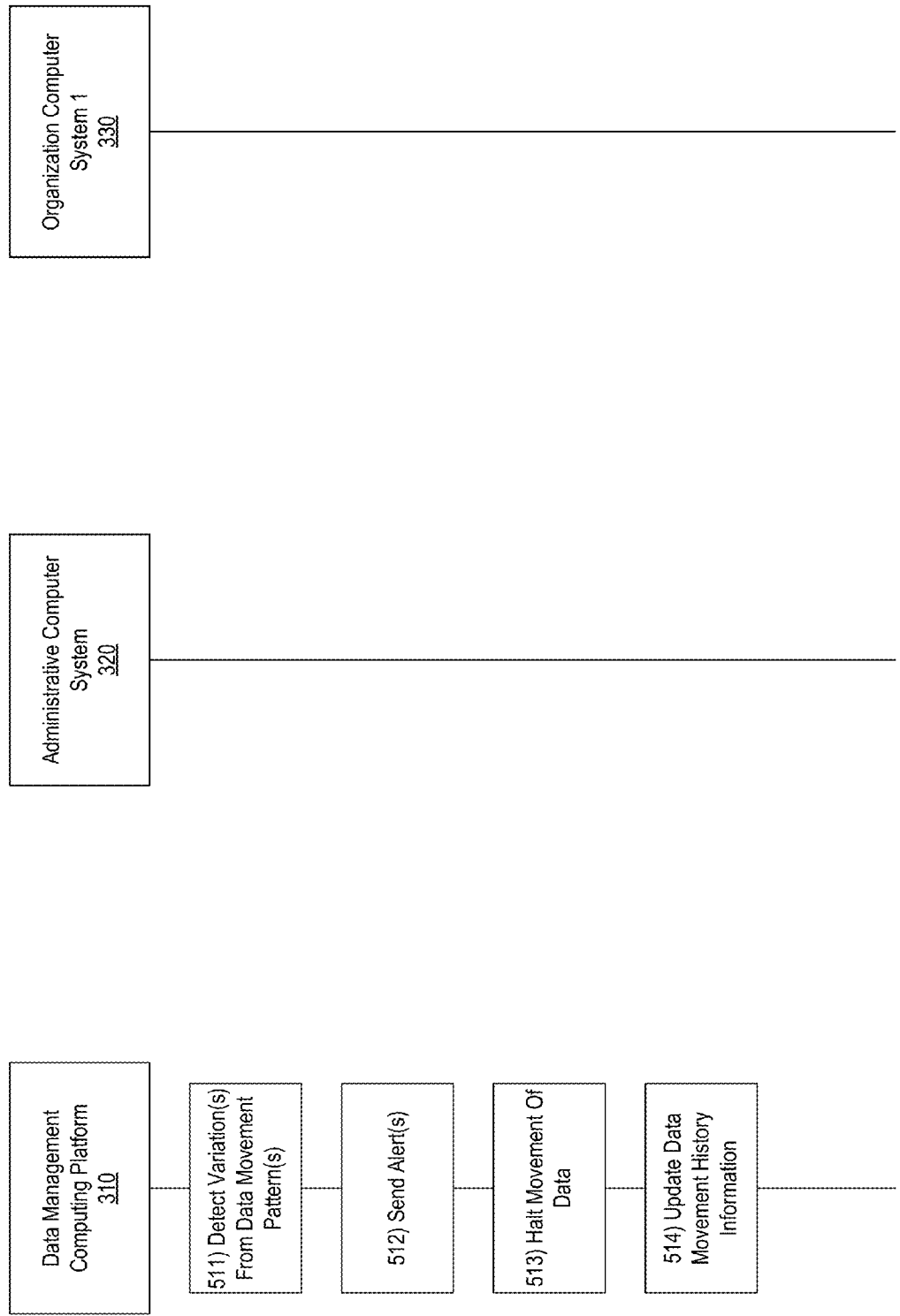

FIGS. 5A-5C depict another illustrative event sequence for managing enterprise data movement using a heuristic data movement detection engine in accordance with one or more example embodiments. In particular, the example event sequence shown in FIGS. 5A-5C illustrates how the movement of enterprise data may be analyzed and/or managed in instances in which the enterprise data is to be moved to an external computer system outside of an enterprise organization. As seen in FIGS. 5A-5C, several steps of the example event sequence are similar to steps of the example event sequence discussed above and may be performed in a similar manner as discussed above. For the sake of brevity, some details that have already been discussed above will not be repeated below, as data management computing platform 310, administrative computer system 320, and/or organization computer system 330 may perform one or more steps of the example event sequence in a similar manner and/or in accordance with the details discussed above, for instance.

For example, referring to FIG. 5A, at step 501, administrative computer system 320 may receive input defining a data movement pattern (e.g., similar to how administrative computer system 320 may receive input defining a data movement pattern at step 401). At step 502, administrative computer system 320 may store information defining the data movement pattern (e.g., similar to how administrative computer system 320 may store information defining a data movement pattern at step 402). At step 503, administrative computer system 320 may send information defining the data movement pattern to data management computing platform 310 (e.g., similar to how administrative computer system 320 may send such information at step 403). At step 504, data management computing platform 310 may receive the information defining the data movement pattern from administrative computer system 320 (e.g., similar to how data management computing platform 310 may receive such information at step 404). At step 505, data management computing platform 310 may store information defining the data movement pattern (e.g., similar to how data management computing platform 310 may store such information at step 405).

Referring to FIG. 5B, at step 506, organization computer system 330 may receive a command to move data to an external computer system. For example, organization computer system 330 may be used by, operated by, maintained by, and/or otherwise associated with an enterprise organization (e.g., a financial institution, as discussed above), and at step 506, organization computer system 330 may receive a command to move data from organization computer system 330 to another computer system that is not used by, operated by, maintained by, and/or otherwise associated with the enterprise organization. For instance, at step 506, organization computer system 330 may receive a command to move enterprise data from organization computer system 330 to external computer system 380, and external computer system 380 may, for instance, be associated with a different organization than organization computer system 330.

At step 507, organization computer system 330 may prepare the data for movement to the external computer system (e.g., similar to how organization computer system 330 may prepare the data at step 407). At step 508, organization computer system 330 may initiate the movement of data to the external computer system (e.g., similar to how organization computer system 330 may initiate the movement of data at step 408).

At step 509, data management computing platform 310 may receive, from a filtering engine, data that is associated with the movement of data initiated by organization computer system 330. For example, data management computing platform 310 may, at step 509, receive such data from a filtering engine running on organization computer system 330. Additionally or alternatively, data management computing platform 310 may, at step 509, receive such data from a filtering engine running on intermediary computer system 350 (which may, e.g., be configured to detect and/or monitor the movement of enterprise data into and/or out of the domain of the enterprise organization operating data management computing platform 310 and/or further configured to provide such data to data management computing platform 310 for evaluation). At step 510, data management computing platform 310 may evaluate the data received from the filtering engine based on one or more data movement patterns (e.g., similar to how data management computing platform 310 may evaluate data at step 410).

Referring to FIG. 5C, at step 511, data management computing platform 310 may detect one or more variations from the one or more data movement patterns (e.g., similar to how data management computing platform 310 may detect such variations at step 411). At step 512, data management computing platform 310 may send one or more alerts based on detecting the one or more variations (e.g., similar to how data management computing platform 310 may send such alerts at step 412). At step 513, data management computing platform 310 may halt the movement of data (e.g., similar to how data management computing platform 310 may halt a movement of data at step 413). At step 514, data management computing platform 310 may update data movement history information (e.g., similar to how data management computing platform 310 may update data movement history information at step 414).

Figure 10:
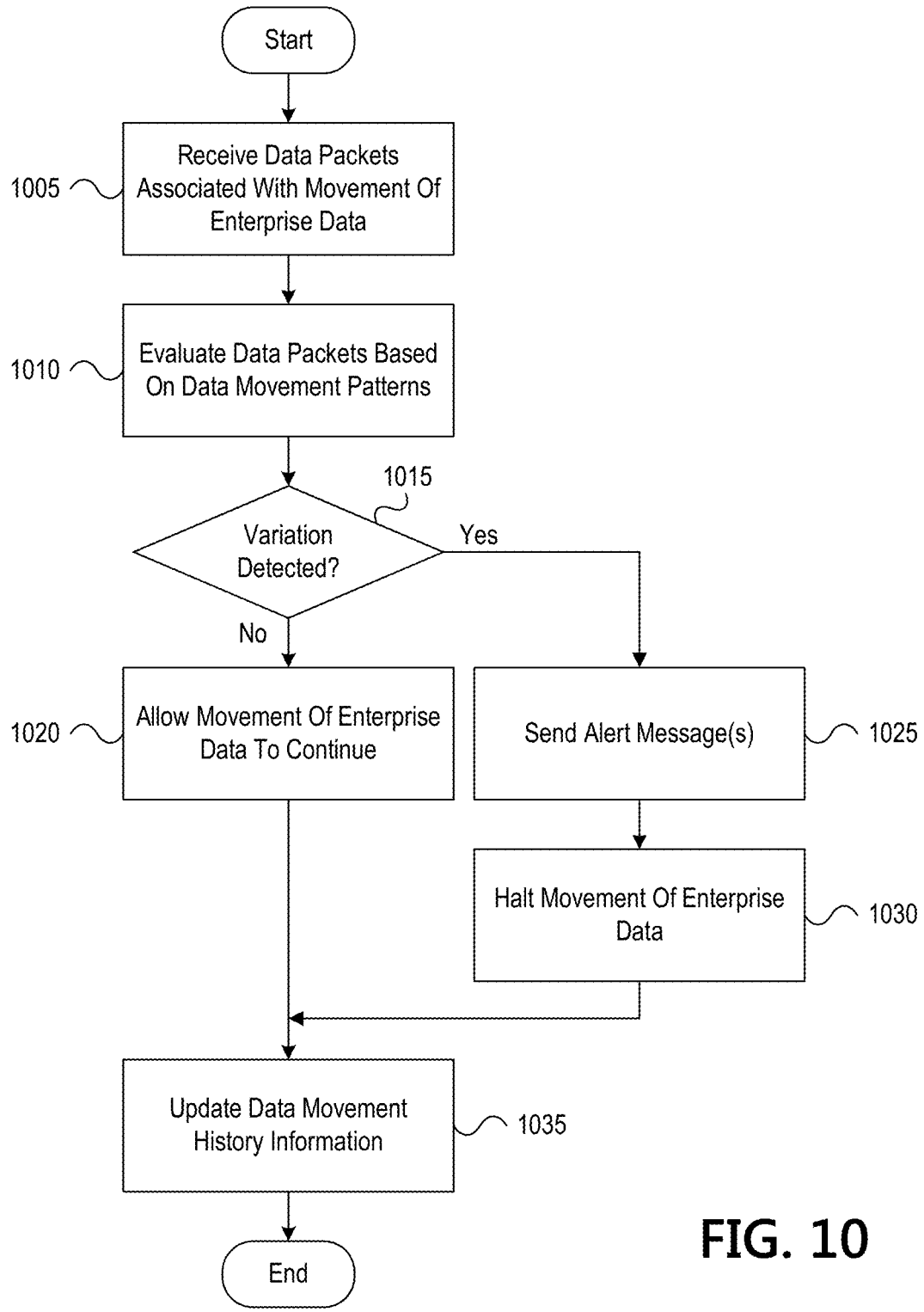
FIG. 10 depicts an illustrative method for managing enterprise data movement using a heuristic data movement detection engine in accordance with one or more example embodiments.

FIG. 10 depicts an illustrative method for managing enterprise data movement using a heuristic data movement detection engine in accordance with one or more example embodiments. Referring to FIG. 10, at step 1005, a computing platform may receive one or more data packets associated with a movement of enterprise data. At step 1010, the computing platform may evaluate the one or more data packets based on one or more data movement patterns. At step 1015, the computing platform may determine whether a variation has been detected in evaluating the one or more data packets based on one or more data movement patterns. If the computing platform determines that a variation has not been detected, then at step 1020, the computing platform may allow the movement of enterprise data to continue. Alternatively, if the computing platform determines that a variation has been detected, then at step 1025, the computing platform may send one or more alert messages. In addition, if the computing platform determines that a variation has been detected, then at step 1030, the computing platform may halt the movement of enterprise data. Subsequently, at step 1035, the computing platform may update data movement history information based on the movement of enterprise data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, one or more data packets associated with a movement of enterprise data intercepted by a filtering engine;
   evaluate the one or more data packets associated with the movement of enterprise data intercepted by the filtering engine based on at least one predefined data movement pattern;
   detect at least one variation from the at least one predefined data movement pattern based on the evaluating of the one or more data packets associated with the movement of enterprise data intercepted by the filtering engine;
   send, via the communication interface, at least one alert message based on the detecting of the at least one variation from the at least one predefined data movement pattern; and
   halt the movement of enterprise data based on the detecting of the at least one variation from the at least one predefined data movement pattern, wherein halting the movement of enterprise data comprises sending one or more commands to a source computer system associated with the movement of enterprise data to stop a transfer of data associated with the movement of enterprise data.

2. The system of claim 1, wherein the memory stores additional computer-readable instructions that, when executed by the at least one processor, further cause the system to:
   update data movement history information based on the detecting of the at least one variation from the at least one predefined data movement pattern.

3. The system of claim 1, wherein the movement of enterprise data is associated with a request to move enterprise information from a first computing device associated with an enterprise organization to a second computing device associated with the enterprise organization.

4. The system of claim 3, wherein the filtering engine runs on the first computing device associated with the enterprise organization.

5. The system of claim 3, wherein the filtering engine runs on the second computing device associated with the enterprise organization.

6. The system of claim 1, wherein the movement of enterprise data is associated with a request to move enterprise information from a first computing device associated with an enterprise organization to a second computing device associated with an entity different from the enterprise organization.

7. The system of claim 6, wherein the filtering engine runs on the first computing device associated with the enterprise organization.

8. The system of claim 6, wherein the filtering engine runs on an intermediary system that is associated with the enterprise organization and configured to intercept outbound data packets.

9. The system of claim 1,
wherein the at least one predefined data movement pattern identifies one or more timing considerations, and
wherein the evaluating of the one or more data packets associated with the movement of enterprise data intercepted by the filtering engine comprises analyzing a timing of the movement of enterprise data intercepted by the filtering engine based on the one or more timing considerations.

10. The system of claim 1,
wherein the at least one predefined data movement pattern identifies one or more size considerations, and
wherein the evaluating of the one or more data packets associated with the movement of enterprise data intercepted by the filtering engine comprises analyzing a size of the movement of enterprise data intercepted by the filtering engine based on the one or more size considerations.

11. The system of claim 1,
wherein the at least one predefined data movement pattern identifies one or more destination considerations, and
wherein the evaluating of the one or more data packets associated with the movement of enterprise data intercepted by the filtering engine comprises analyzing a destination of the movement of enterprise data intercepted by the filtering engine based on the one or more destination considerations.

12. The system of claim 1, wherein sending the at least one alert message comprises sending an alert message to a user of a computing device who initiated the movement of enterprise data intercepted by the filtering engine.

13. The system of claim 12, wherein the alert message is configured to notify the user of the computing device that the movement of enterprise data intercepted by the filtering engine varies from a predefined data movement pattern.

14. The system of claim 12, wherein the alert message is configured to prompt the user of the computing device to halt the movement of enterprise data intercepted by the filtering engine.

15. The system of claim 12, wherein the alert message is configured to prompt the user of the computing device to allow the movement of enterprise data intercepted by the filtering engine.

16. The system of claim 1, wherein sending the at least one alert message comprises sending an alert message to one or more information security management users of one or more information security management computing devices associated with an enterprise organization.

17. A method, comprising:
at a computing platform comprising at least one processor, memory, and a communication interface:
receiving, by the at least one processor, via the communication interface, one or more data packets associated with a movement of enterprise data intercepted by a filtering engine;
evaluating, by the at least one processor, the one or more data packets associated with the movement of enterprise data intercepted by the filtering engine based on at least one predefined data movement pattern;
detecting, by the at least one processor, at least one variation from the at least one predefined data movement pattern based on the evaluating of the one or more data packets associated with the movement of enterprise data intercepted by the filtering engine;
sending, by the at least one processor, via the communication interface, at least one alert message based on the detecting of the at least one variation from the at least one predefined data movement pattern; and
halting, by the at least one processor, the movement of enterprise data based on the detecting of the at least one variation from the at least one predefined data movement pattern, wherein halting the movement of enterprise data comprises sending one or more commands to a source computer system associated with the movement of enterprise data to stop a transfer of data associated with the movement of enterprise data.

18. One or more non-transitory computer-readable media storing instructions that, when executed by a computer system comprising at least one processor, memory, and a communication interface, cause the computer system to:
receive, via the communication interface, one or more data packets associated with a movement of enterprise data intercepted by a filtering engine;
evaluate the one or more data packets associated with the movement of enterprise data intercepted by the filtering engine based on at least one predefined data movement pattern;
detect at least one variation from the at least one predefined data movement pattern based on the evaluating of the one or more data packets associated with the movement of enterprise data intercepted by the filtering engine;
send, via the communication interface, at least one alert message based on the detecting of the at least one variation from the at least one predefined data movement pattern; and
halt the movement of enterprise data based on the detecting of the at least one variation from the at least one predefined data movement pattern, wherein halting the movement of enterprise data comprises sending one or more commands to a source computer system associated with the movement of enterprise data to stop a transfer of data associated with the movement of enterprise data.

* * * * *